United States Patent [19]

Iemura et al.

[11] 4,379,602
[45] Apr. 12, 1983

[54] ROTATABLE STOCK CONTAINER CLOSET

[75] Inventors: Takusuke Iemura; Takeshi Goto; Hiroshi Komaki, all of Yokohama, Japan

[73] Assignee: Okamura Corporation, Japan

[21] Appl. No.: 203,449

[22] Filed: Nov. 3, 1980

[30] Foreign Application Priority Data

Mar. 11, 1980 [JP] Japan .................. 55-30585[U]

[51] Int. Cl.³ .................. A47B 49/00; B65G 17/16
[52] U.S. Cl. .................. 312/268; 312/97;
312/132; 312/135; 198/799
[58] Field of Search ............. 312/268, 269, 134, 132, 312/131, 135, 186, 202, 97, 97.1, 91; 198/799

[56] References Cited

U.S. PATENT DOCUMENTS

| | | | |
|---|---|---|---|
| 2,781,922 | 2/1957 | Hibbard | 198/799 |
| 2,928,705 | 3/1960 | Goldsmith | 312/135 |
| 3,103,396 | 9/1963 | Portnoy | 312/132 |
| 3,531,171 | 9/1970 | Raabe et al. | 312/268 |
| 3,578,832 | 5/1971 | Toms | 312/91 |
| 3,770,105 | 11/1973 | O'Neal | 312/97 |
| 4,017,132 | 4/1977 | Banys | 312/268 |

FOREIGN PATENT DOCUMENTS

1013075 12/1965 United Kingdom .............. 312/268

*Primary Examiner*—Victor N. Sakran
*Attorney, Agent, or Firm*—Ostrolenk, Faber, Gerb & Soffen

[57] ABSTRACT

A rotatable stock container closet for the storage of articles such as electronic parts, or the like, includes a plurality of container conveying units arranged vertically one on another, each container conveying unit comprising outer and inner rail means, guide channel means arranged therebetween, an endless traction chain, a driving means therefor, and a series of stock containers, releasably disposed to the traction chain means, moving on and along the rail means, so that any container may be reached most expeditiously by selectively operating each container conveying unit.

8 Claims, 17 Drawing Figures

ROTATABLE STOCK CONTAINER CLOSET

BACKGROUND OF THE INVENTION

The present invention relates generally to an article stock closet, and more particularly to an improvement in a rotatable stock container closet including a plurality of open containers for the storage of articles such as electronic parts, or the like, movably arranged in a plurality of container conveying units arranged vertically one on another.

The typical design of a conventional stock container closet of movable type including a plurality of movable open containers is such that each of the containers is carried by four free-running wheels on and along a pair of outer and inner rails disposed in parallel with each other, two wheels each on each of the outer and inner rails, respectively. With such construction, when the container runs along a curved section of the rail, it is observed that these wheels are forced to turn along the curvature of the rail, each wheel on the outer side differing in its running direction and rotation number from those characteristics of each wheel on the inner side, causing the wheels on the outer side to continuously slip slightly sideways off their original running direction while passing through the curved section, thus resulting in such an adverse effect that the container wheels are likely to be worn due to such forced slipping motion and the container is subjected to a substantial resistance in the running operation. The turms "outer" and "inner" as used herein are defined to mean the outside and inside as viewed from the central portion of the frame structure of the stock container closet having the general-construction as shown in FIG. 1, respectively.

On the other hand, after a long time use of a stock container closet of the type mentioned above, it is inevitable that the joints or connected points of an endless pull or traction chain would get worn so that the total extension or loop of the chain would thus become longer, which would very possibly spoil a smooth running operation of the chain along the guide rails, eventually causing such trouble that the containers would run out of their tracks.

In this respect, it has been the practice that two shafts for the chain driving sprockets are preliminarily provided with an adjustability in the span or distance across their axes outwardly to a desired extent so that a possible slack due to wear of the chain may adjustably be absorbed, and at the same time the guide rails are provided with split parts near their ends on one side or on opposite sides of the straight sections thereof opposedly adjacent the curved sections thereof so that the split parts may adjustably be away from the straight ends of the principal rail portion to extend the total stretch or length of the straight sections of the rails to such an extent that would correspond to the distance of axial adjustment of the sprocket shaft for due compensation for the amount of slack on the driving chain, while thus formed gap or gaps between the extended split parts and the straight ends of the principal rail portions may be filled up with a filler plate or plates so as to form a smooth continuation of the rails where so connected.

For this purpose, there are required a variety of filler plates having many different sizes and enough to cover such gaps as are formed from the axial adjustment of the sprocket shaft or shafts, which would naturally mean a troublesome job requiring substantial time and labor.

The present invention is essentially directed to meet such inconveniences and drawbacks which have not been attended with satisfactory results.

SUMMARY OF THE INVENTION

It is therefore a primary object of the present invention to provide a rotatable stock container closet which is improved substantially in the performance and durability in comparison with the conventional design of such stock container closet mentioned above.

It is another object of the invention to provide a rotatable stock container closet which provides a high efficiency of approaching any desired articles stored in any containers.

It is still another object of the invention to provide a rotatable stock container closet which enables an axial adjustment of sprocket shafts to be conducted with lessened labor and parts involved in the compensation for a slack of the driving chain.

It is a further object of the invention to provide a rotatable stock container closet which can be installed with its only one side open for approach, so that it may present a substantial versatility in installation in a limited space.

The above and other objects of the present invention can be attained in practice with a rotatable stock container closet including a plurality of container conveying units arranged vertically one on another, each container conveying unit comprising (a) an endless loop of outer rail means extending in the horizontal plane, (b) discrete inner rail means extending in the horizontal plane, arranged inside the outer rail means at a certain distance away therefrom, (c) discrete guide channel means extending in the horizontal plane, arranged between the inner and the outer rail means at a certain distance away therefrom, (d) an endless loop of traction chain means which is guided by the guide channel means and is adapted to be moved along the same, (e) a means for driving the traction chain means, and (f) a plurality of container means releasably disposed to the traction chain means so as to be moved on and along the inner and the outer rail means together therewith.

The principle, nature and details of the present invention will, as well as advantages thereof, become more apparent from the following detailed description with respect to preferred embodiments of the present invention, in connection with the accompanying drawings, in which like parts are designated with like reference numerals.

DETAILED DESCRIPTION OF PREFERRED EMBODIMENTS

The present invention will now be described in detail with respect to the first embodiment thereof in conjunction with FIGS. 1 through 5.

Figure 1:
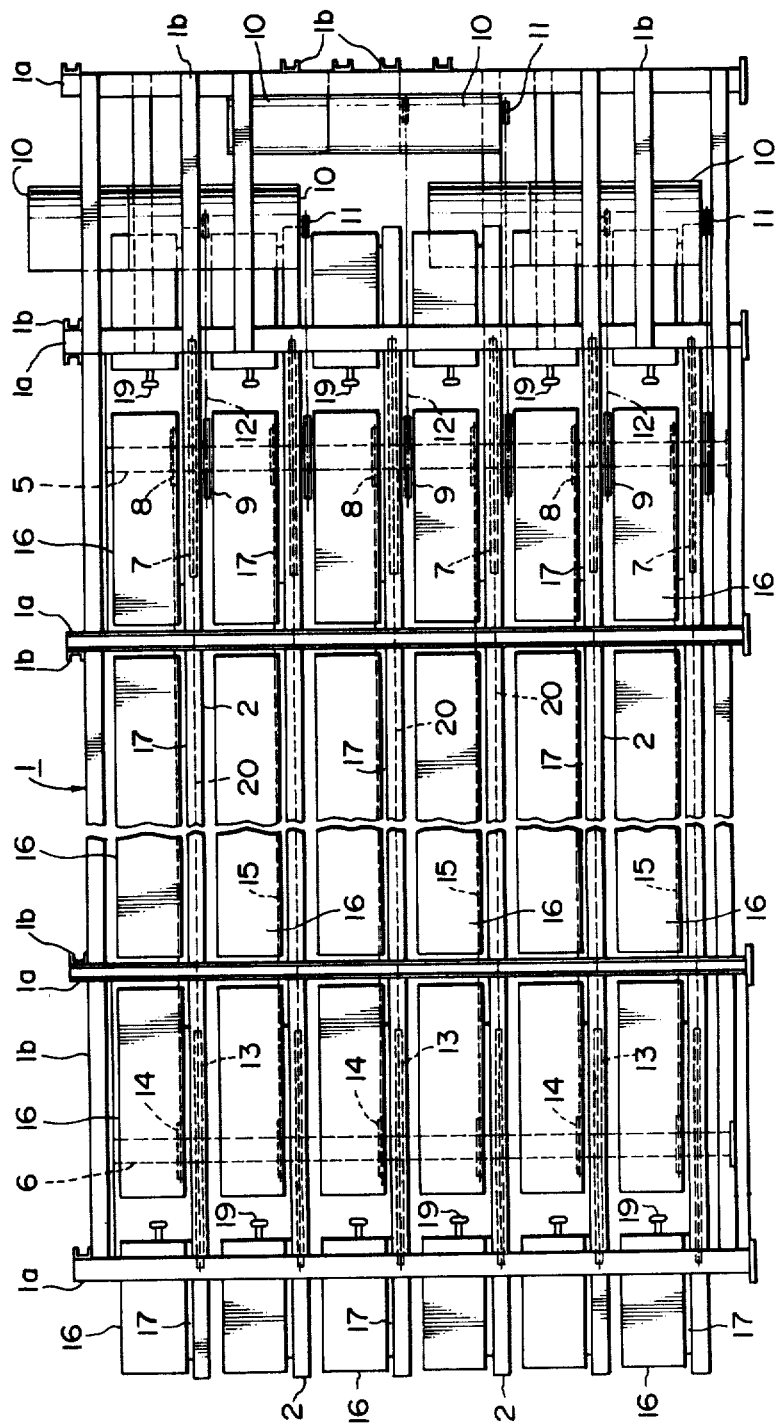
FIG. 1 is a front elevational view showing, partly broken away, a first embodiment of a rotatable stock container closet according to the present invention.

Referring, to FIG. 1, there is shown a frame structure 1 of a generally rectangular parallelopiped shape constructed with a plurality of struts 1a standing upright and spaced equally with each other and a plurality of bridge beams 1b extending across adjacent struts 1a at right angles therewith to connect together to form the whole frame structure of rectangular parallelopiped shape.

There are provided a desired number of outer rails 2 surrounding the outer circumference of the frame structure 1 in a generally elliptic shape and being arranged vertically one on another at a desired interval, and a corresponding number of inner rails 3 extending straight in parallel with the straight extension of the outer rails 2 and being arranged vertically one on another at a desired interval, yet at a relatively vertically higher level than that of the outer rail 2.

Also, there is provided a guide channel 4 having a generally U-shaped cross-sectional shape between each outer rail 2 and inner rail 3 located opposedly as a pair, and the guide channel extends in parallel with and at the same height as the straight section of the outer rail 2, respectively.

There are provided two vertical shafts, i.e. a first shaft 5 and a second shaft 6 standing upright in the centers of the both right and left semi-circular sections of the frame structure 1, respectively, as generally shown in FIG. 1. The first shaft 5 is provided with a plurality of first driving sprockets 7 mounted rotatably therearound and at a corresponding interval with each other along the length thereof to those of the guide channels 4 so that the driving sprockets 7 are located at the same level as that of each guide channel in each stage thereof. Each sprocket has a diameter generally equal to a span or distance between the opposedly mounted guide channels 4 in each stage thereof and the sprocket has a plurality of depressions 7a spaced equally around the circumference thereof. Also, the first shaft 5 is provided with a first transmission sprocket 8 mounted coaxially thereof above the first driving sprocket 7 and another sprocket 9 mounted similarly coaxially thereunder in such a manner that the sprockets 8 and 9 may rotate together with a respective first driving sprocket 7 at its each stage. With this construction, each driving speocket 7 may be driven in rotation together with its own pair of sprockets 8 and 9 in each stage independently from other sets comprising the first driving sprocket 7 and the pair of sprockets 8 and 9 by an independent prime mover at choice.

There are also installed a plurality of electric motors 10 on the right side as viewed in FIG. 1 of the frame structure 1, each mounted in the upright position corresponding to each stage of the outer rail 2 in such a manner that the driving sprocket 11 of each motor 10 is operatively connected to each of the sprockets 9 by way of an endless drive chain 12, whereby each sprocket 9, and hence each of the first driving sprocket 7 and the first transmission sprocket 8 which belong to the same set thereof may freely be driven in rotation by the electric motor 10 independently from the other sets of sprockets 7, 8 and 9. Each motor at choice can be operated independently from others.

Likewise, the second shaft 6 is provided with a plurality of second driving sprockets 13 and a plurality of second driving sprockets 14 similar to the first driving sprockets 7 and the first transmission sprockets 8, respectively, in the same manner as in the first shaft 5, yet without any sprockets similar to the sprockets 9.

Since both sprockets 8 and 14 in a corresponding pair are operatively connected with each other by way of an interlocking or driving chain 15, both first and second driving sprockets 7 and 13 in a corresponding pair are driven in rotation at an equal speed and in the same direction by an electric motor 10 so selected.

There are shown a plurality of container 16 of generally rectangular parallelopiped shape for the commodity stock, each of the containers being mounted releasably upon a mount plate 17 by way of channeled cross members 17a which are disposed in parallel to the both shorter sides of the rectangular mount plate 17. Each mount plate 17 has two wheels 18 disposed under the outer or right longitudinal side thereof and a panel 17b bent upright at the inner or left edge thereof having another couple of wheels 19, disposed thereupon as viewed in FIG. 5. With such construction of the mount plate 17, each container 16 may be carried upon the outer rail 2 and the inner rail 3 through the mount plate 17 having its wheels 18 and 19 engaging with these rails, respectively.

Figure 2:
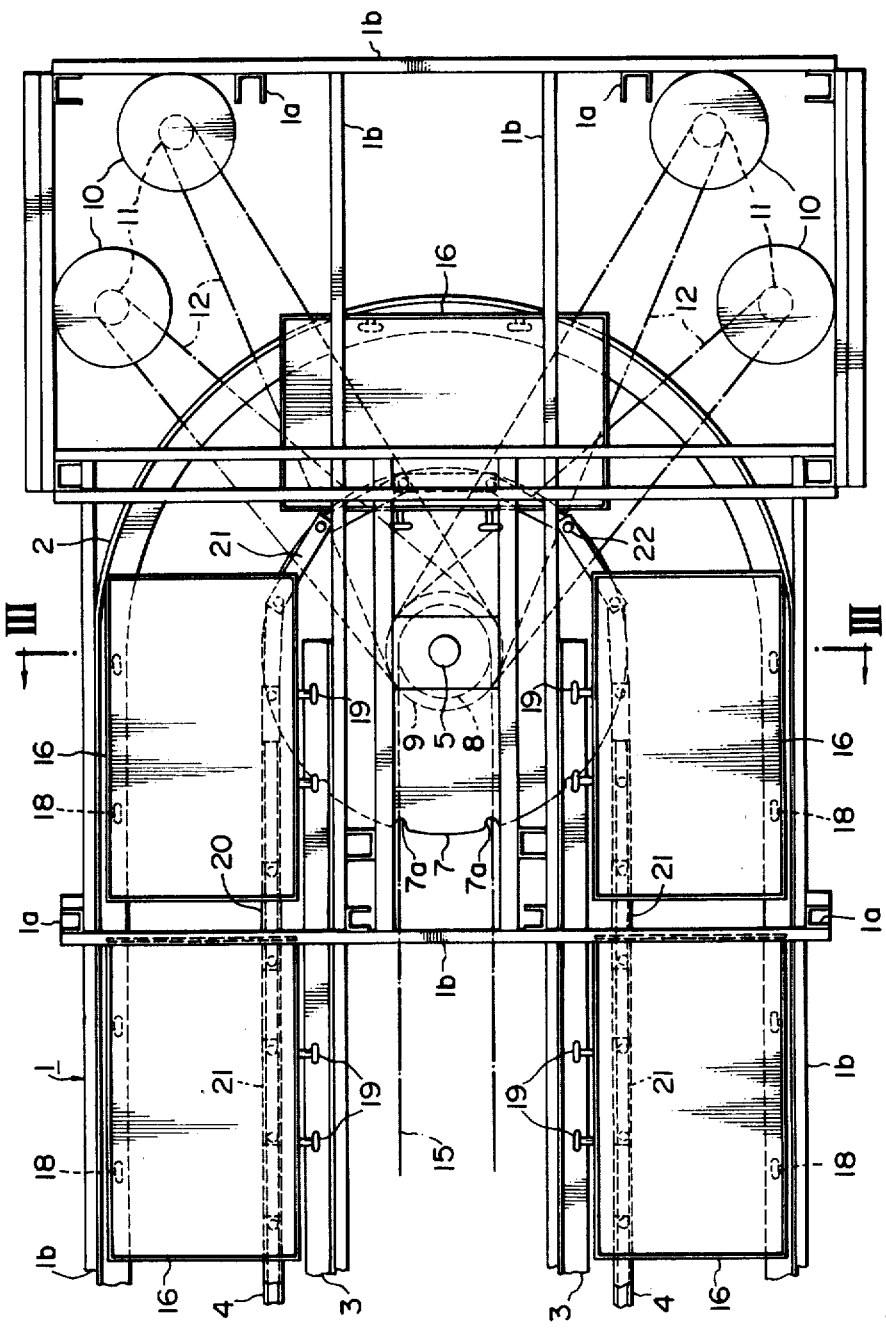
FIG. 2 is an enlarged fragmentary plan view showing the main part of the container closet of this invention.
Figure 3:
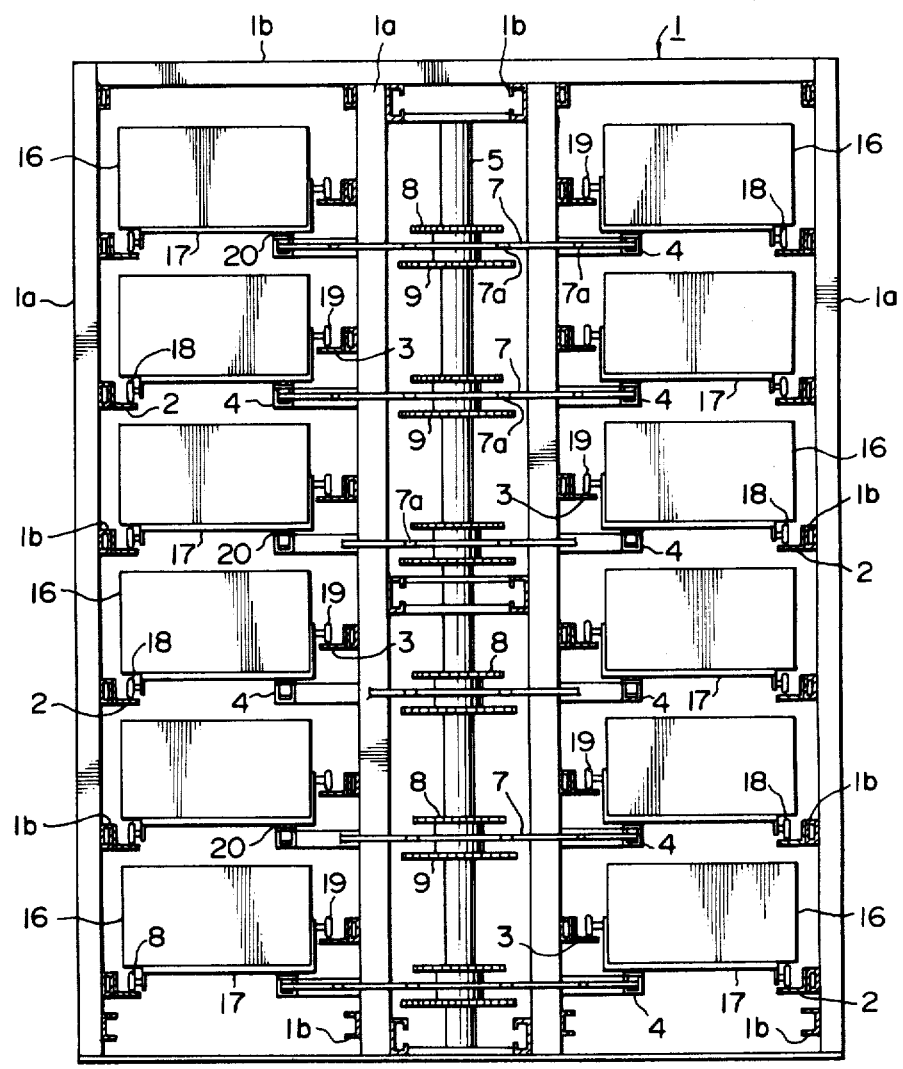
FIG. 3 is a vertical cross-sectional view taken along the line III—III in FIG. 2.
Figure 4:
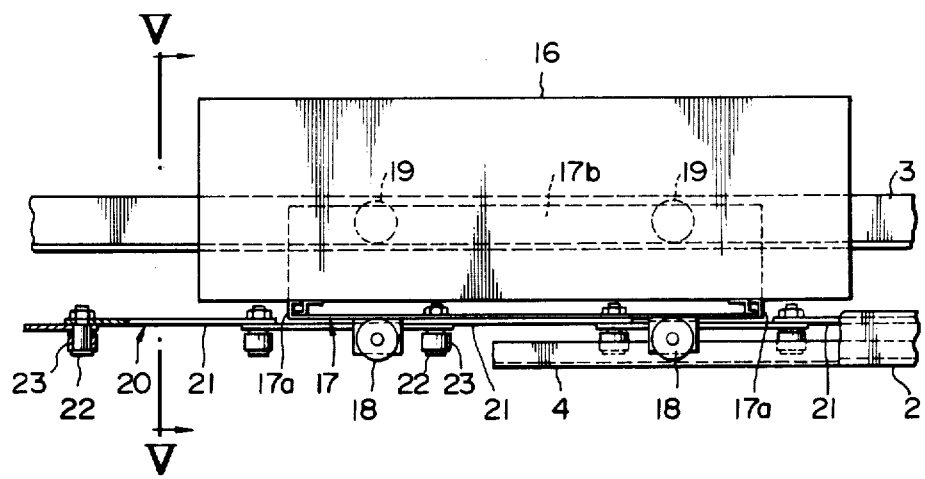
FIG. 4 is an enlarged view showing a container part of the container closet shown in FIG. 1.
Figure 5:
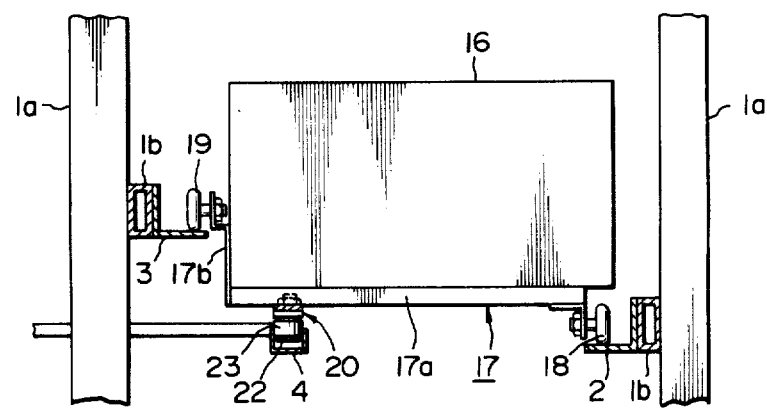
FIG. 5 is a vertical cross-sectional view taken along the line V—V in FIG. 4.
Figure 6:
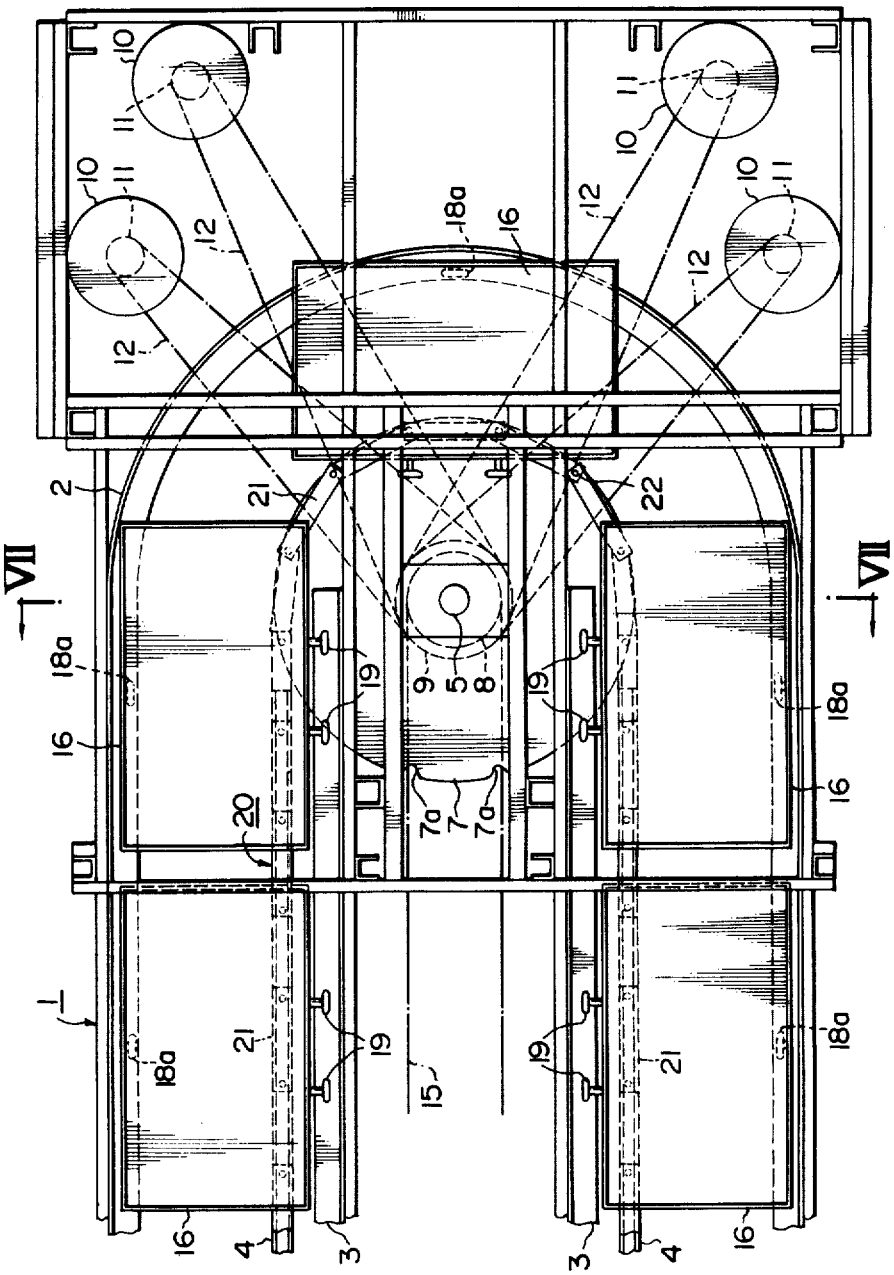
FIG. 6 is a similar view to FIG. 2 showing the main part of the container closet by way of a second embodiment of the invention.
Figure 7:
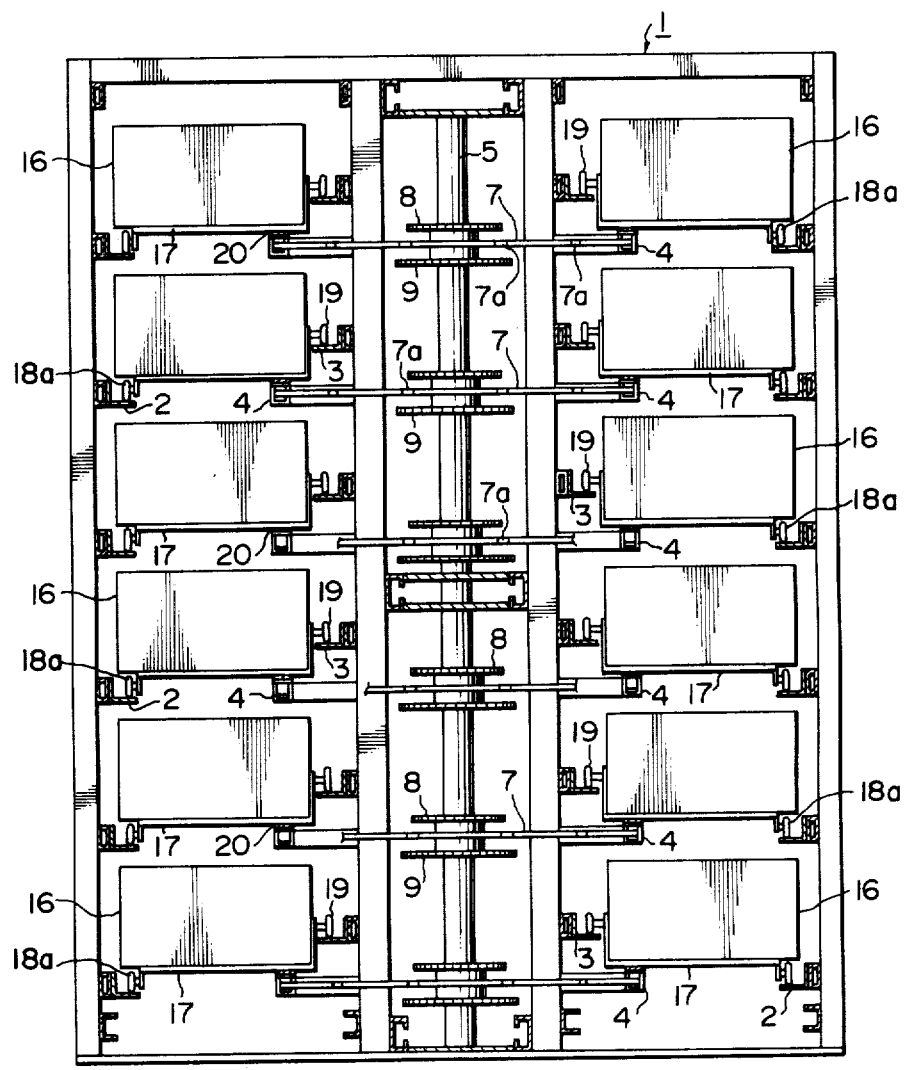
FIG. 7 is a vertical cross-sectional view taken along the line VII—VII in FIG. 6.
Figure 8:
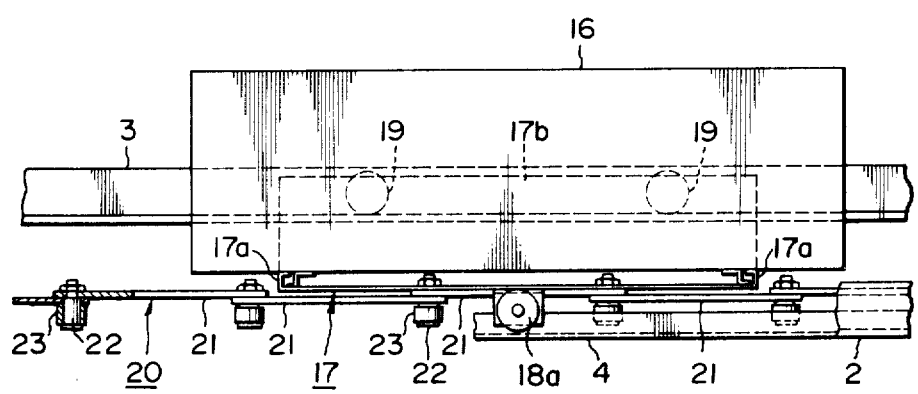
FIG. 8 is a similar view to FIG. 4 showing the container closet shown in FIG. 6.

Also there is provided an endless traction chain 20 which comprises, as typically shown in FIGS. 2 and 4, a plurality of elongated coupling elements or strips 21 pivotally connected end-to-end with each other by a plurality of vertical connecting pins 22 so as to form an endless articulated loop. Each connecting pin 22 is equipped with a roller 23 which is adapted to rotatably engage with the guide channel 4 and also to snugly dwell in the depressions 7a and 13a formed in the circumferences of the first and second driving sprockets 7 and 13, respectively.

On the other hand, each container 16 has its own mount plate 17 thereunder suitably connected to the traction chain 20 by way of the normal manner known to those skilled in the art, so that the plurality of containers may operatively be connected to the chain through the mount plates in an endless manner along the extension of the chain at a predetermined interval with each other.

With such construction of the stock container closet according to the present invention, in operation, when the motor 10 at choice is operated, the one first driving sprocket 7 operatively connected with this motor is now driven in rotation together with the one second driving sprocket 13 corresponding thereto, thus causing the endless traction chain 20 stretched across these two sprockets to move along the guide channels 4. Hence, the plurality of containers 16 connected to this particular traction chain 20 are driven in succession in such a manner that at the straight section of the frame structure 1, the containers upon the mount plate 17 may travel in straight motion on and along the both outer and inner rails 2 and 3, and at the curved or semi-circular section thereof where the inner rail 3 is interrupted so that there is no inner rail 3, they may travel in curvilinear motion on and along the circumference of the first or second driving sprocket 7 or 13 with their inner edges being supported generally on the circumferential areas of the sprockets.

Therefore, the operator may advantageously reach a desired article stocked in a certain container 16 of the one set by controlling automatically the positioning of this particular container to a predetermined place of handling through a shortest possible travel by using an electronic unit, not shown, to select a desired electric motor 10 to be operated belonging to a stage where exists that container, and select the on/off operation and the rotating direction of that motor.

The desired article may be manually taken out in a desired number or may be reached by removing the whole container 16 out of the mount plate 17. When it is necessary to stock articles in order, the operator may operate the closet in the reverse order.

While in the embodiment as stated above, there are provided the outer rail 2 of an elliptic shape and the two driving sprockets 7 and 13 located at the opposite ends of this rail and adapted to drive the traction chain 20 extending therebetween, it is naturally practicable that the interlocking chain 15 may be omitted and the second driving sprocket 13 may be a follower or driven sprocket.

Also, as is apparent to those skilled in the art, the outer rail 2 may be made, for example, in the form of a circle, while the inner rail 3 and the guide channel 4 may be arranged in the like circular forms disposed coaxially with respect to the outer rail 2.

Furthermore, it is also feasible that the second driving sprocket in the form of a follower or driven sprocket as mentioned above may be omitted at all, and the thus formed gaps in the paths of the inner rail 3 and the guide channel 4 being filled in continuation with semi-circular shaped inner rail and guide channel extension elements disposed in a coaxial relationship with respect to the outer rail, respectively.

As typically shown in FIG. 1, since the movable type stock container closet according to the present invention is equipped with a large number of containers 16, it is advantageous that a variety of articles may be stocked in order in the manner that they may be reached expeditiously and easily whenever so desired. In addition, according to this particular stock container closet, since every container may readily be reached for loading and unloading operations with only one side of the closet left open for approach while leaving other sides closed with adjacent furniture or the like, it may usefully serve to be installable in the limited space of a building.

Also, as a stage of containers of this stock container closet may selectively be operated independently from others, it is possible to simultaneously operate more than one stage of containers for the handling of articles desired at the same time. This feature will undoubtedly contribute to the improvement in productivity of the mass production line in the electronic industry and the like where an extra variety of parts are required in the assembly work.

Next, the present invention will be described by way of a second embodiment thereof in conjunction with FIGS. 6 through 9.

Figure 9:
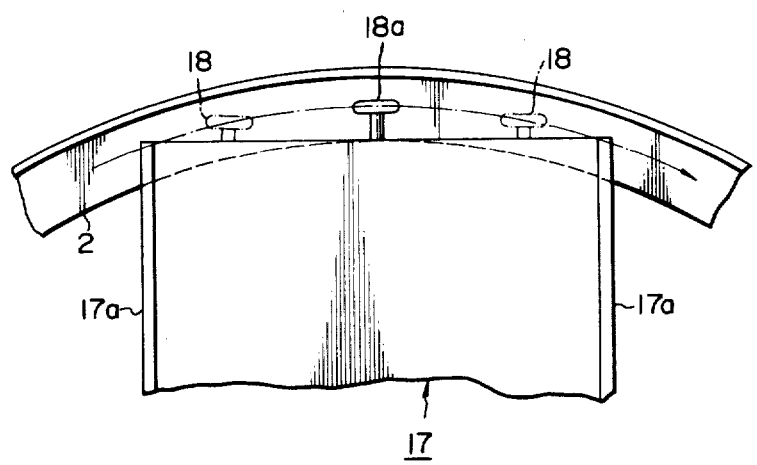
FIG. 9 is an enlarged plan view showing the mount plate portion from which a container is taken away.
Figure 10:
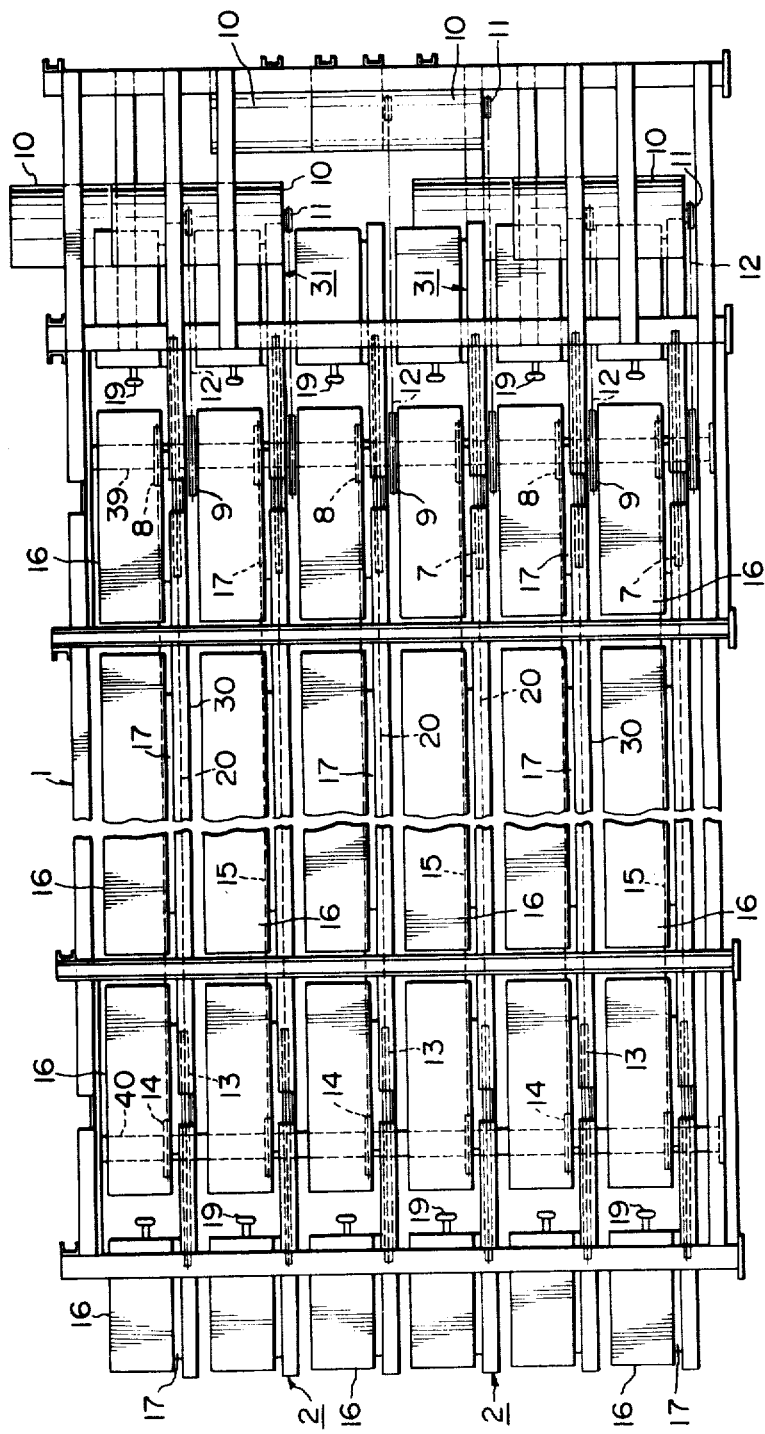
FIG. 10 is a similar view to FIG. 1 showing generally the container closet by way of a third embodiement of the present invention.

Since this second embodiment of the invention is featured in the arrangement of a single wheel 18a provided in the center of the outer longitudinal side of the mount plate 17, as best shown in FIG. 9, with all the remaining parts being left alike with the first mentioned embodiment of the invention, the description will now be limited to this respect only for avoiding an undue burden on the reader.

In the first mentioned embodiment, owing to the construction such that the two outer wheels 18 rigidly disposed near the outer corners of the mount plate 17 are designed to run on and along the outer rail 2, when a container 16 is pulled along the semi-circular track of the outer rail 2, these two wheels 18 may take different tracks off the path as shown by a one-dotted line in FIG. 9. Consequently, these wheels in curvilinear motion are forced to continuously slip slightly sideways off their running direction, thus resulting in such adverse effect that the wheels are likely to be worn in a relatively short period of use and the container is subjected to a substantial resistance in the running operation.

According to the second embodiment of the invention, in contrast, there is a single outer wheel 18a disposed at the center of the outer longitudinal side of a mount plate 17 having its axis of rotation oriented constantly in the centripetal direction of a curvature of the path of motion while passing through a curved path of motion, so that the plane of rotation of this single wheel 18a may constantly comply with its own path of motion, thus relieving the wheel from an undue load and thus affording a smooth travel of a container 16.

During the curvilinear motion of the container 16, the inner wheels 19 on the inner longitudinal side of the mount plate 17 are now carried upon the generally circumferential area of the driving sprocket 7 or 13 and the mount plate 17 is operatively connected to the traction chain 20, and consequently, the container 16 may be held assuredly from tilting or tumbling. Needless to mention that this will also be effected in order in the case that the container runs along the straight section of the rail 2.

While the foregoing is of the case that there is a generally elliptic section of the outer rail 2 including a straight section as a part, there may be a case that the outer rail 2 is, for example, of an entirely circular shape, not shown. For this case, the containers 16 may well travel along the circular track with a single wheel provided in the place of the two wheels 19 as in the first mentioned embodiment, together with a suitable mount between a container 16 and a traction chain 20 providing a specific cooperative function to prevent the container from tilting or tumbling, or alternatively, together with suitable means disposed at the both front and rear ends of the adjacent containers or container mount plates adaptable to cooperatively aid contact therebetween, whereby a plurality of containers may be operated free from any trouble during the travel around the circular-shaped track, as in the case of an elliptic track including a straight section therein.

Now, a third embodiment of the present invention will be described with respect to FIGS. 10 through 17, wherein the general construction is basically similar to the first mentioned embodiment of the invention, therefore, omitting any further description on the overlapping parts thereof for the clarity.

There are provided a plurality of outer rails 2 having an L-shaped cross-sectional shape and extending in an elliptic extension around the outer circumference of the frame structure 1. The plurality of outer rails 2 are mounted at a predetermined interval with each other, each having a straight section 30 and a semi-circular section 31, as partly shown in FIG. 11.

Figure 13:
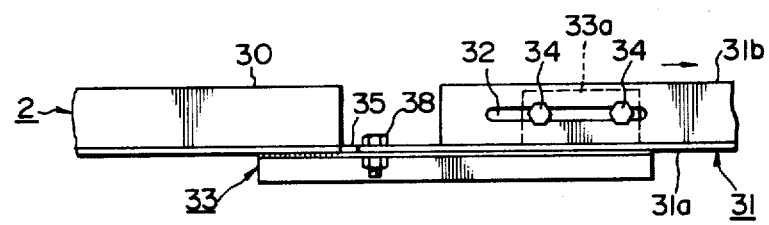
FIG. 13 is an enlarged front elevational view showing the detail of the split part of the outer rail.
Figure 14:
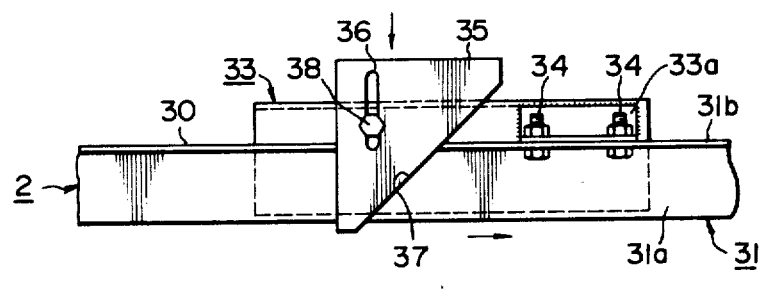
FIG. 14 is an enlarged plan view showing the detail of the split part of the same rail.
Figure 15:
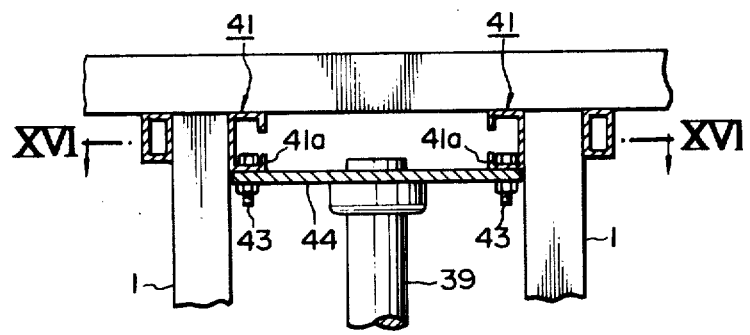
FIG. 15 is an enlarged fragmentary view showing, partly in section, the central upper part including the sprocket shaft mount of the closet.
Figure 16:
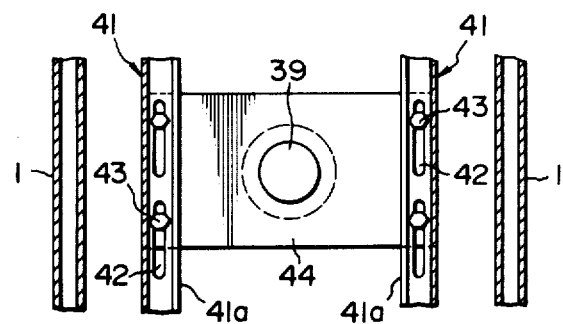
FIG. 16 is a cross-sectional view taken along the line XVI—XVI in FIG. 15.
Figure 17:
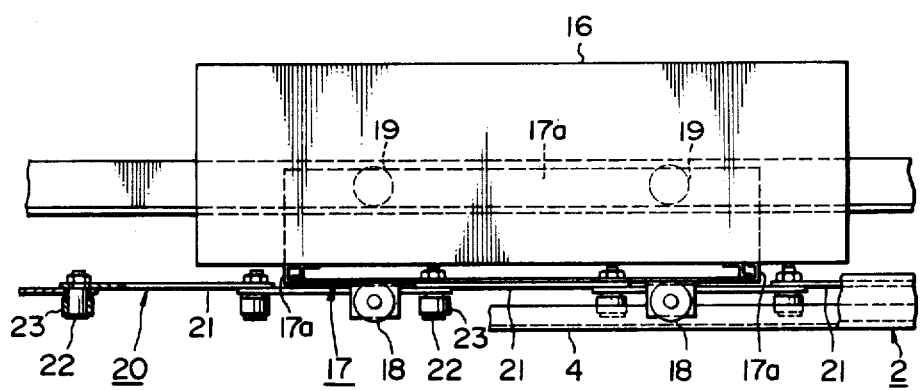
FIG. 17 is an enlarged fragmentary view showing the container portion of the container closet of the invention.

As best shown in FIGS. 13 and 14, while the end face of each of the straight sections 30 of the outer rails 2 is right-angled, the end face of each of the semi-circular section 31 thereof is formed with the horizontal leg 31a defining an acute angle with respect to the opposite edge to the upright leg 31b of the semi-circular section 31, an elongated opening 32 being provided near the end of each upright leg 31b. Also, under the end of the straight section 31 adjacent the semi-circular section 31 of the rail 2, there is rigidly connected a horizontal joint plate 33 at one end thereof, an angled element 33a being fixed securely upon the other end of the joint plate 33. With this arrangement, the straight section 31 and the semi-circular section 31 are jointed together by way of bolts 34 secured threadedly through the elongated opening 32 in the upright leg 31b to the angled element 33a.

On the other hand, there is provided a filler element or plate 35 having a generally right-angled triangle shape in plan and having an elongated opening 36 at a suitable place extending to be right-angled with respect to the outer rail when installed in position. This filler plate 35 is adapted to be placed like a wedge between a gap of a trapezoid-like shape to be formed between the opposed ends of each of the straight section 30 and the semi-circular section 31 of the outer rail 2, with the acute-angled side thereof abutting snugly along the corresponding side of the horizontal leg 31a, so that there may adjustably be provided a smooth continuation between the horizontal leg ends of the opposed section 30 and 31 of the rail 2, when set in position by using a bolt 38 to be secured threadedly through the elongated opening 36 to the joint plate 33, in accordance with the manner of adjustment in compensation for a slack of the worn traction chain 20 to be described further later.

As in the first mentioned embodiment of the invention, there are provided the inner rails 3 extending inwardly of and in parallel with the straight section 30 of the outer rail 2, and also the guide channels 4 having a generally U-shaped cross-sectional shape and extending at the same level and in parallel with the straight section 30 of the outer rail 2 intermediate the two rails 2 and 3.

Figure 11:
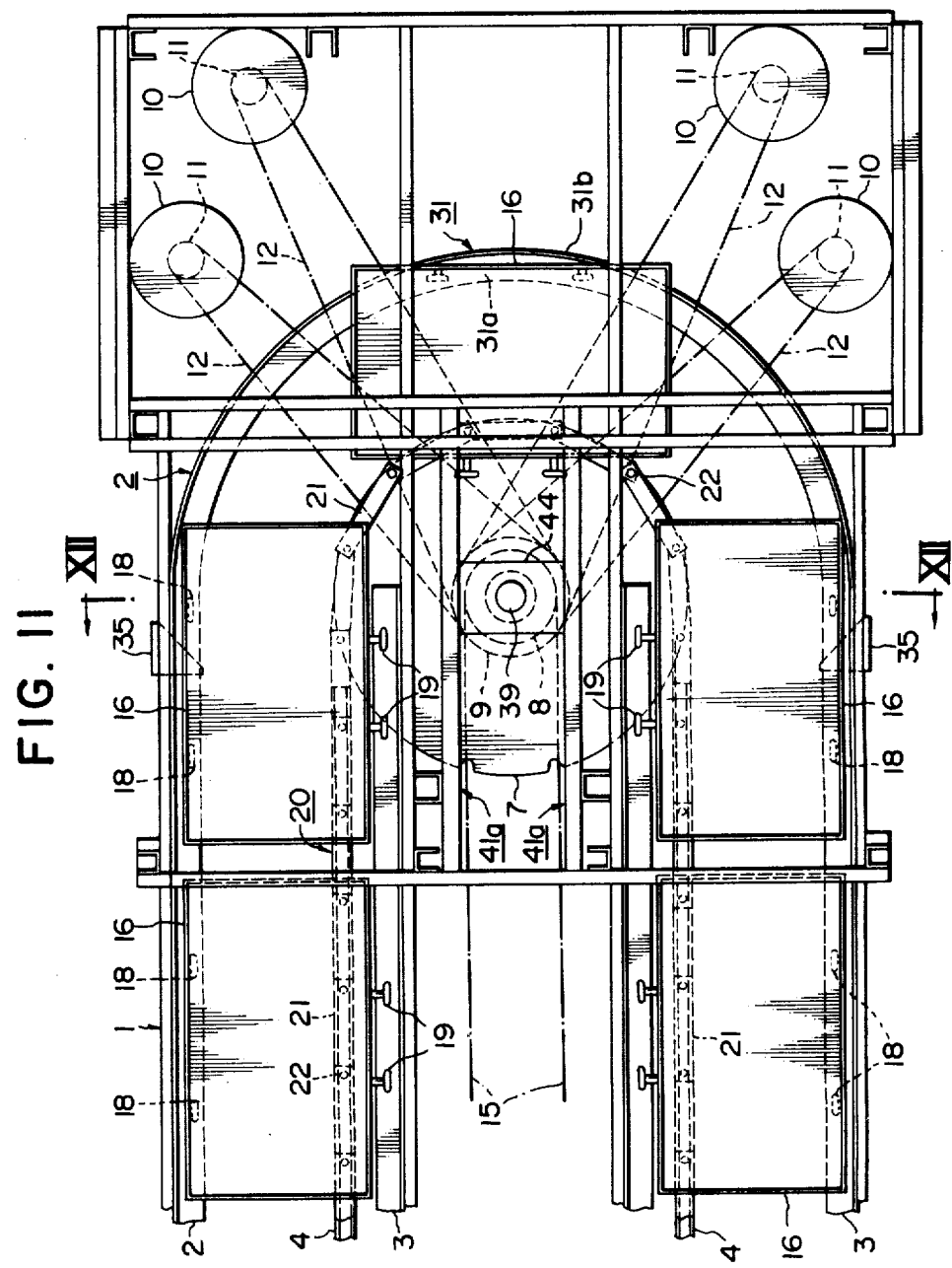
FIG. 11 is a similar view to FIGS. 2 and 6 showing the main part of the container closet shown in FIG. 10.
Figure 12:
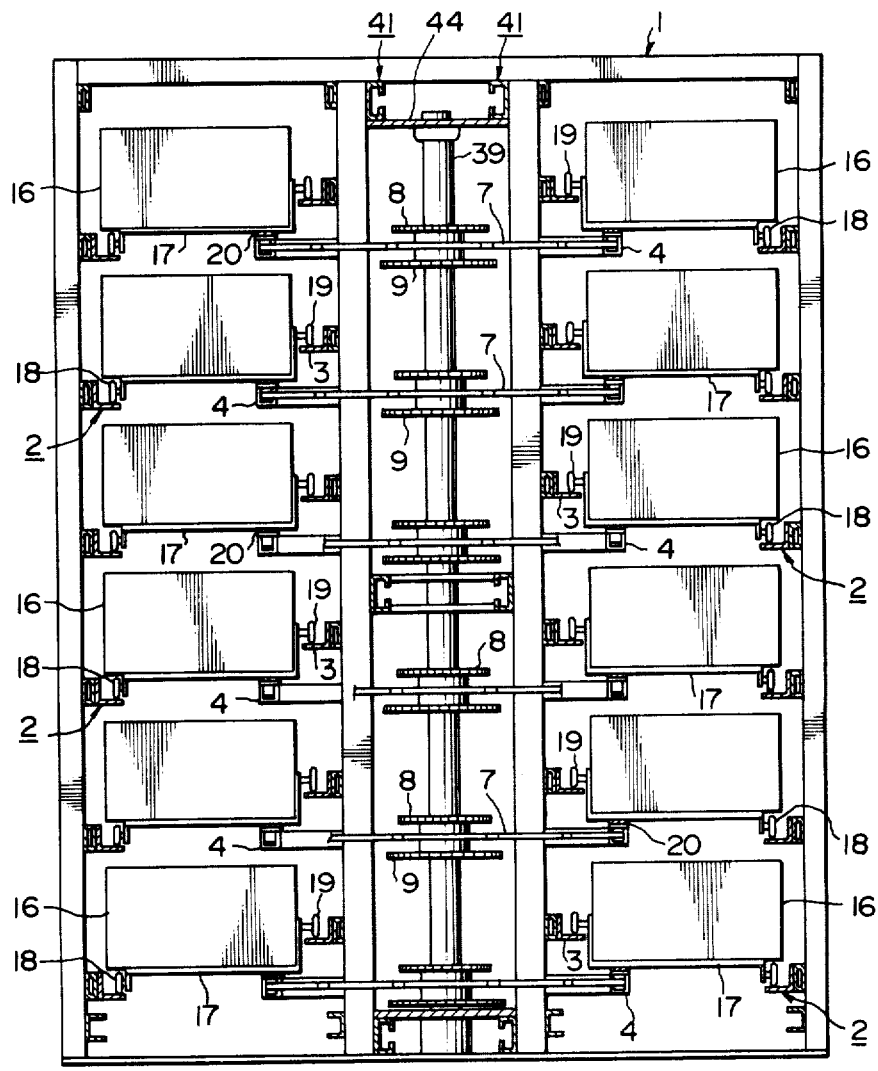
FIG. 12 is a vertical cross-sectional view taken along the line XII—XII in FIG. 11.

On the other hand, there are provided the first and second vertical shafts 39 and 40 standing upright in the centers of the opposite semi-circular sections of the outer rail 2 in the manner as stated below. More particularly, in the right section of the frame structure 1 there are provided a pair of shaft mount sections or bars 41 for the first shaft 39 having channelled legs 41a (see FIG. 15) extending in parallel with each other in the upper center of the right semi-circular section of the outer rail 2 as generally shown in FIG. 11, each of the channelled legs 41a having elongated openings 42 extending longitudinally along the shaft mount bar 41 (see FIG. 16). A shaft mount plate 44 is fixed in position of the shaft mount bars by way of bolts 43 secured threadedly through the elongated openings 42. In the center of this shaft mount plate 44, the first shaft 39 is pivotally held at its upper end, and is also held its opposite end in the like manner, not shown, in the lower position of the frame structure 1. Also, the second vertical shaft 40 is pivotally held at the left section of the frame structure 1 in the like manner with the first shaft 39.

As in the first mentioned embodiment of the invention, the first and second shafts 39 and 40 are provided with the plurality of first and second driving sprockets 7 and 13, the plurality of first transmission sprockets 8 and sprockets 9 and second transmission sprockets 14, respectively.

Now, in the adjustment of the axial position of or space between the first and/or second vertical shaft 39 and/or 40 to compensate for a slack of the traction chain 20 due to wearing of the elongated coupling elements thereof which would eventually result in lack of smooth operation of the containers after a long time service of the stock container closet according to this invention, it is the practice as in the conventional construction such that the first shaft 39, for example, is firstly shifted in its location toward outwardly or right as viewed in FIG. 11 by unscrewing the bolts 43 and sliding the shaft mount plate 44 outwardly along the elongated openings 42 in the mount plate to an extent enough to absorb the slack of the traction chain 20, and also shifting each of the electric motors 10 corresponding to each of the first transmission sprockets 8 on this particular first shaft, or alternatively, the endless chains 12 are shortened, accordingly, in the manner omitted in description and illustration. Of course, such adjustment may likewise be made on the part of the second vertical shaft 40 at the same time.

Next, the semi-circular section or sections 31 of the outer rail 2 is shifted in location outwardly or to the right as viewed in FIG. 11 by unscrewing the bolts 34 in the joint parts between the straight sections 30 and the semi-circular section 31 and then sliding the semi-circular section 31 outwardly along the elongated openings 32 provided in the upright leg 31b of the outer rail 2 in the attempt to extend the total extension of the entire outer rail 2 corresponding to the amount of shift of the first shaft 39. At this moment, there are formed gaps 37 between the both opposed ends of the straight sections 30 and the semi-circular section 31 of the outer rail 2. These gaps 37 may now be filled up by unscrewing the bolts 38 and then sliding the filler plates 35 toward the gaps along the elongated openings 36 so as to form a smooth continuation across the gaps 37 between the opposed horizontal leg ends of the straight and semi-circular sections 30 and 31.

In the case that the traction chains 20 are replaced with new ones, i.e. having a rather short extension before use, the adjustment may be made with such procedures as mentioned above in the reverse order.

As fully explained hereinbefore, according to the rotatable stock container closet of the present invention, it is advantageous that axial adjustment of the sprocket shafts can now be conducted readily without the necessity to prepare a variety of filler plates having many different dimensions to be used in the compensation for a slack of the traction chains in comparison with the conventional construction.

Although the present invention has been described with reference to preferred embodiments thereof, however, various changes and modifications can be made by those skilled in the art without departing from the scope of the present invention.

What is claimed is:

1. A rotatable stock container closet including a plurality of container conveying units arranged vertically one on another, each container conveying unit comprising:
   (a) an endless loop outer rail means extending in the horizontal plane; the outer rail means generally having an elliptic shape comprising a pair of discrete straight sections extending in parallel with each other and a pair of discrete curvilinear sections, with the sections having free ends and the free ends of the curvilinear sections being connected to the free ends of the straight sections;
   (b) discrete inner rail means extending in the horizontal plane, arranged inside the outer rail means at a certain distance away therefrom;
   (c) discrete guide channel means extending in the horizontal plane, arranged between the inner and the outer rail means at a certain distance away therefrom;
   (d) an endless loop traction chain means which is guided by the guide channel means and is adapted to be moved along the same;
   (e) a means for driving the traction chain means; and
   (f) a plurality of container means releasably disposed to the traction chain means and connected to ride along the rail means so as to be moved on and along the inner and the outer rail means and together with the traction chain means.

2. A container closet as defined in claim 1, wherein each container means is disposed to the traction chain means through a respective support means, the container means being connected to ride along the rail means by the container support means being provided with inner wheel means for running on the inner rail means and outer wheel means for running on the outer rail means.

3. A container closet as defined in claim 2, wherein the inner and the outer wheel means comprise two inner wheels and two outer wheels, respectively.

4. A container closet as defined in claim 2, wherein the inner and the outer wheel means comprise two inner wheels and one outer wheel, respectively.

5. A container closet as defined in claim 1, wherein the length of the outer rail means is adjustable for absorbing the slack of the traction chain by a coupling plate means which is slidably and closely fitted into a gap adjustably formed between the free end of each discrete straight section and the free ends of one discrete curvilinear section of the outer rail means so that the coupling plate forms a part of the outer rail means.

6. A container closet as defined in claim 5, wherein there are two of the coupling plate means, each being fitted into a gap between the free end of each discrete straight section and the opposed free end of the discrete curvilinear section of the outer rail means.

7. A container closet as defined in claim 5 or 6, wherein the coupling plate means conforms to the gap between the discrete straight section and the discrete curvilinear section of the outer rail means and is formed in a trapezoidal shape and is oriented so that diverging sides of the trapezoidal shape thereof contact the opposed free ends of a straight and a curvilinear section of the outer rail means and the coupling plate means being movable across the opposed free ends to conform to the length of the gap.

8. A container closet as defined in claim 5 or 6, wherein the coupling plate means conforms to the gap between the discrete straight section and the discrete curvilinear section of the outer rail means and is formed in a triangular shape and is oriented so that diverging sides of the triangular shape thereof contact the opposed free ends of a straight and a curvilinear section of the outer rail means and the coupling plate means being movable across the opposed free ends to conform to the length of the gap.

* * * * *